United States Patent
Takada

(10) Patent No.: US 8,602,747 B2
(45) Date of Patent: Dec. 10, 2013

(54) VENTILATION DEVICE AND ELECTRICAL EQUIPMENT IN WHICH SAME IS INSTALLED

(75) Inventor: Masayuki Takada, Aichi (JP)

(73) Assignee: Panasonic Corporation, Osaka (JP)

( * ) Notice: Subject to any disclaimer, the term of this patent is extended or adjusted under 35 U.S.C. 154(b) by 472 days.

(21) Appl. No.: 12/918,417

(22) PCT Filed: Mar. 3, 2009

(86) PCT No.: PCT/JP2009/000947
§ 371 (c)(1),
(2), (4) Date: Aug. 19, 2010

(87) PCT Pub. No.: WO2009/110219
PCT Pub. Date: Sep. 11, 2009

(65) Prior Publication Data
US 2011/0000652 A1    Jan. 6, 2011

(30) Foreign Application Priority Data

Mar. 6, 2008 (JP) ................................. 2008-056138

(51) Int. Cl.
*F04B 49/06* (2006.01)
*H02P 7/06* (2006.01)

(52) U.S. Cl.
USPC ......... 417/44.11; 417/44.2; 417/45; 388/804; 388/806

(58) Field of Classification Search
USPC ......... 417/44.11, 44.2, 45; 318/599; 388/804, 388/806, 811, 815, 819, 821, 822, 823
See application file for complete search history.

(56) References Cited

U.S. PATENT DOCUMENTS

| 6,452,349 | B1 * | 9/2002 | Hahn et al. | 318/400.22 |
| 7,095,189 | B2 * | 8/2006 | Lelkes et al. | 318/400.01 |
| 7,292,004 | B2 * | 11/2007 | Ueda et al. | 318/805 |
| 7,710,056 | B2 | 5/2010 | Takada | |
| 7,764,031 | B2 * | 7/2010 | Takada | 318/400.07 |
| 8,118,565 | B2 | 2/2012 | Takada | |
| 2003/0175124 | A1 * | 9/2003 | Hahn et al. | 417/44.1 |
| 2008/0298784 | A1 * | 12/2008 | Kastner | 388/811 |
| 2009/0108785 | A1 * | 4/2009 | Takada | 318/400.38 |

FOREIGN PATENT DOCUMENTS

| CN | 1571264 A | 1/2005 |
| CN | 101019302 A | 8/2007 |
| JP | 2001-286179 A | 10/2001 |
| JP | 2006-149048 A | 6/2006 |

(Continued)

OTHER PUBLICATIONS

International Search Report for International Application No. PCT/JP2009/000947, Apr. 7, 2009, Panasonic Corporation.

*Primary Examiner* — Charles Freay
*Assistant Examiner* — Alexander Comley
(74) *Attorney, Agent, or Firm* — RatnerPrestia

(57) ABSTRACT

Having a correlative relation indicator for indicating a correlative relation so that the supply current to be supplied to an inverter circuit may be varied proportionally to the voltage applied to the inverter circuit, a supply current value controller controls the average current to be supplied to the inverter circuit so as to be equal to the value of the supply current indicated by the correlative relation indicator, and therefore if the pressure loss or the static pressure is changed, a wind volume-static pressure of high precision extremely small in the changing amount of wind volume is realized.

11 Claims, 7 Drawing Sheets

(56) References Cited

FOREIGN PATENT DOCUMENTS

| | | |
|---|---|---|
| JP | 2007-100574 A | 4/2007 |
| JP | 2008-011634 A | 1/2008 |
| JP | 2008-011634 A | 1/2008 |
| WO | WO 2007/040179 A1 | 4/2007 |

* cited by examiner

VENTILATION DEVICE AND ELECTRICAL EQUIPMENT IN WHICH SAME IS INSTALLED

THIS APPLICATION IS A U.S. NATIONAL PHASE APPLICATION OF PCT INTERNATIONAL APPLICATION PCT/JP2009/000947.

TECHNICAL FIELD

The present invention relates to a blowing device to be installed in a ventilation device, a range hood, a humidifier, a dehumidifier, a refrigerating device, an air-conditioner, or a water heater, and an electrical equipment in which such blowing device is installed.

BACKGROUND ART

Recently, in a blowing device to be incorporated in an electrical equipment such as ventilation device, there is an increasing demand for a blowing device of lower price, higher efficiency, lower noise, smaller pressure loss by duct piping configuration, higher resistance to pressure loss changes due to external wind pressure or clogging of filter, and excellent in controllability so as to ventilate at a constant wind volume by an optimum wind volume depending on an appropriate wind volume depending on the indoor atmosphere.

Conventionally, this type of blowing device is disclosed in, for example, patent literature 1. This blowing device is explained below while referring to FIG. 7.

As shown in FIG. 7, blowing device 10 incorporates centrifugal blower 110a. Centrifugal blower 110a is driven by brushless DC motor 111. Direct-current voltage controller 108 is a step-down chopper circuit for converting a high voltage including ripples after full-wave rectification of a commercial alternating-current power source into a direct-current voltage of 45 V or less. Supply current value controller 122 controls direct-current voltage value changer 114 so that the average current value to inverter circuit 106 to be detected by current detector 121 may be equal to the current value indicated by current value indicator 119, and controls by feedback while varying the output voltage of direct-current voltage controller 108. Wind volume controller 132 changes the current to be supplied in inverter circuit 106 with respect to the reference set value, depending on the output voltage of direct-current voltage controller 108, and indicates to current value indicator 119.

Such conventional blowing device requires a direct-current voltage controller formed of a chopper circuit, and in a blowing device of large output of blowing wind volume, the energy-saving effect may be significantly lowered, and the control circuit is increased in size. Accordingly, in spite of the blowing device of a large output, it is required to adjust the specification easily, such as wind volume-static pressure characteristic and setting of plural wind volumes, without lowering the energy-saving effect.

From the viewpoint of cold draft, when installed in a ventilation device required to reduce the blowing air volume at a constant wind volume, in winter as compared with summer, the blowing wind volume in summer and the blowing wind volume in winter cannot be changed. Therefore, without increasing the required circuit space, it is required to adjust the specification easily, such as wind volume-static pressure characteristic and setting of plural wind volumes, and to control the blowing wind volume depending on the changes of atmospheric temperature.

Patent literature 1: Japanese Patent Unexamined Publication No. 2007-100574

SUMMARY OF THE INVENTION

The present invention is intended to solve these conventional problems, and it is hence an object thereof to present a blowing device capable of realizing a wind volume-static pressure characteristic of a high precision, extremely small in changing amount of wind volume if the pressure loss or the static pressure is changed.

The present invention includes a blower having a brushless DC motor, an inverter circuit connected to the brushless DC motor, an applied voltage detector for detecting the voltage applied to the inverter circuit, a supply current value controller for controlling the average current supplied to the inverter circuit constantly, and a correlative relation indicator for indicating a correlative relation so as to change the supply current to be supplied in the inverter circuit proportionally in relation to the voltage applied to the inverter circuit. Further, the supply current value controller has a configuration for controlling the average current to be supplied to the inverter circuit so as to be the value of the supply current indicated by the correlative relation indicator.

According to such configuration, the changing amount of wind volume is extremely small in spite of changes in the pressure loss or static pressure, and a wind volume-static pressure characteristic of a high precision is realized.

DESCRIPTION OF REFERENCE MARKS

Figure 1:
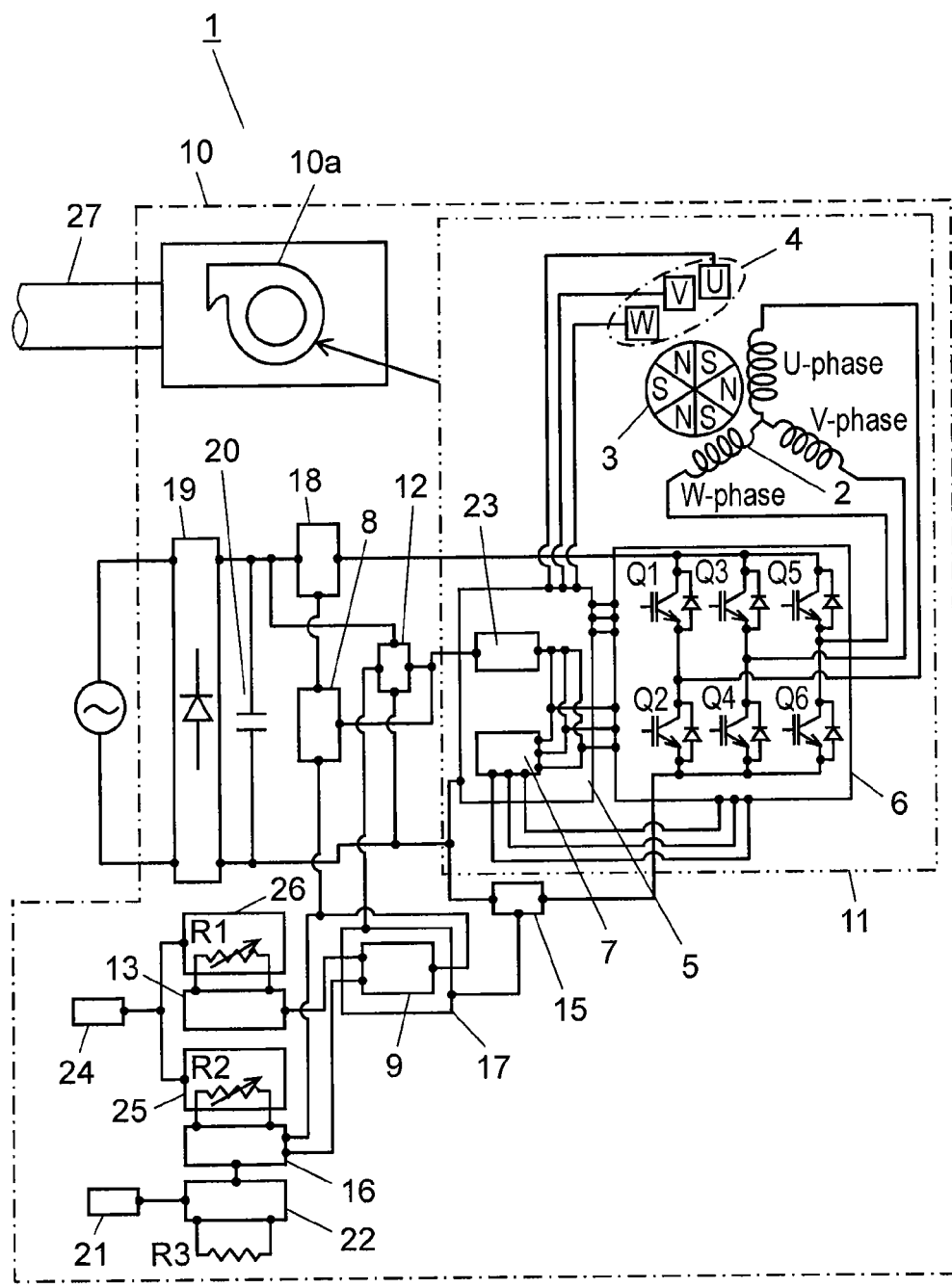
FIG. 1 is a block diagram of a ventilation device in which a blowing device is installed in preferred embodiment 1 of the present invention.

1 Ventilation device
2 Driving coil
3 Magnet rotor
4 Magnetic flux density distribution detector
5 Drive logic controller
6 Inverter circuit
7 Current waveform controller
8 Equivalent voltage detector
9 Current value indicator
10 Blowing device 10a Centrifugal blower
11 Brushless DC motor
12 Duty indicator
13 Correlative relation indicator
15 Current detector
16 Reference current value indicator
17 Supply current value controller
18 Applied voltage detector
19 Rectifier
20 Smoother
21 Atmospheric temperature detector
22 Temperature compensator
23 PWM controller
24 Wind volume indicator
25 Reference current value indication changer
26 Correlative relation changer
27 Duct
28 Speed adjustment indicator
29 External switch
30 Alternating-current power source connector
30a Strong output connection terminal
30b Weak output connection terminal
30c Common connection terminal
31 Wind volume indicator

PREFERRED EMBODIMENT FOR CARRYING OUT THE INVENTION

Preferred embodiments of the present invention are described below by reference to the accompanying drawings.

Preferred Embodiment 1

Figure 2A:
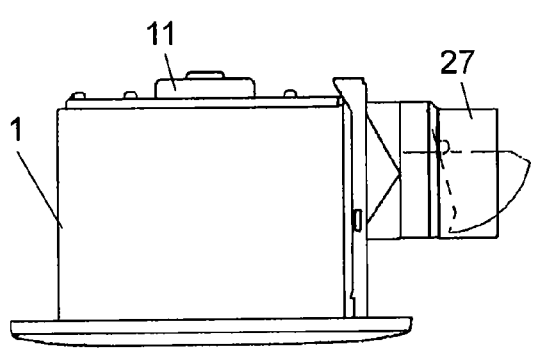
FIG. 2A is a side view of the ventilation device in which the blowing device is installed.
Figure 2B:
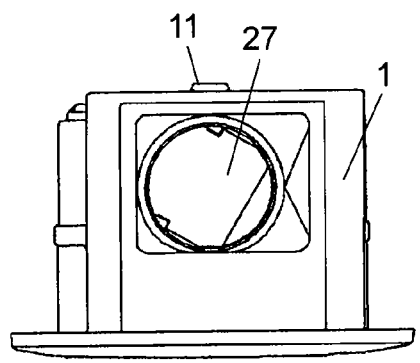
FIG. 2B is a front view of the ventilation device in which the blowing device is installed.
Figure 2C:
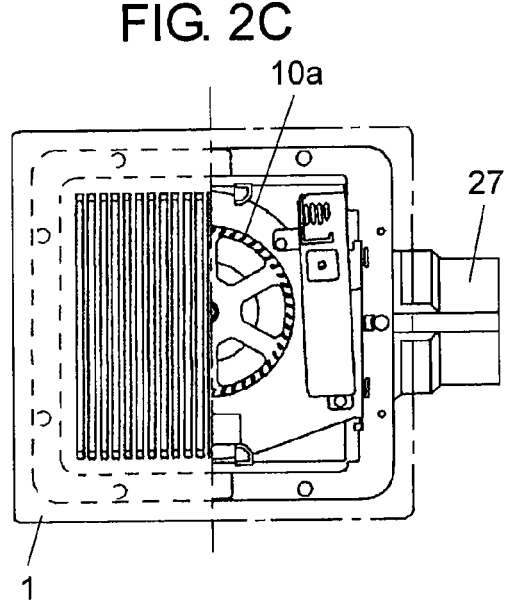
FIG. 2C is a partially cut-away plan view of the ventilation device in which the blowing device is installed.
Figure 3:
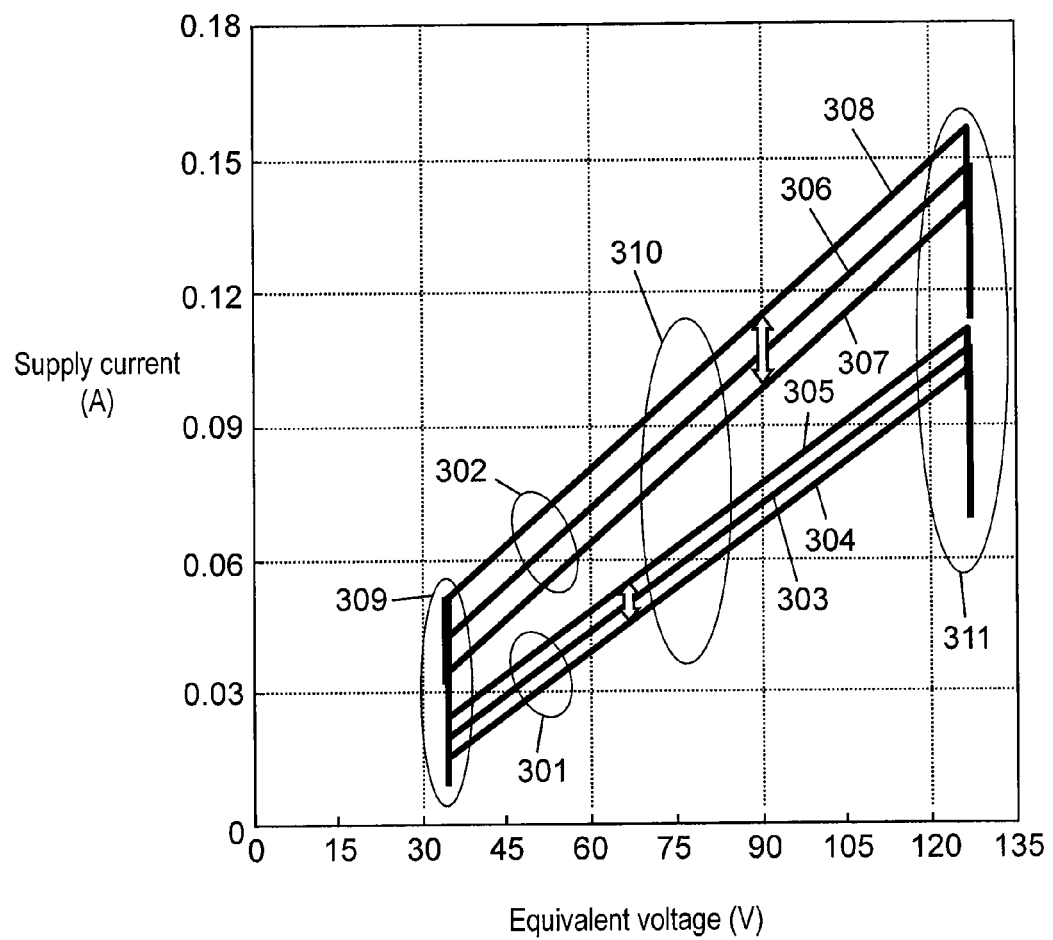
FIG. 3 is a diagram showing an example of an equivalent voltage-inverter circuit supply current characteristic to be applied to an inverter circuit to be installed in the blowing device.
Figure 4:
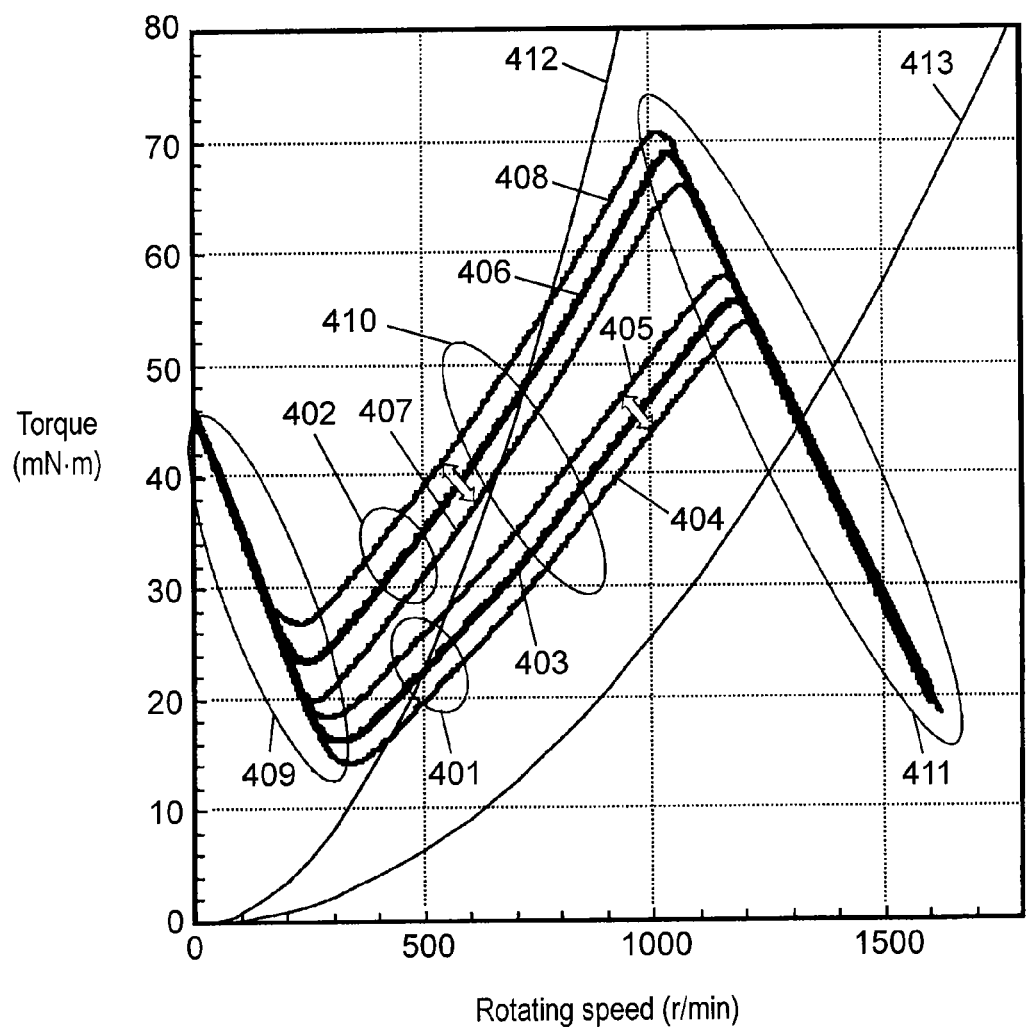
FIG. 4 is a diagram showing an example of a rotating speed-torque characteristic of a brushless DC motor to be installed in the blowing device.
Figure 5:
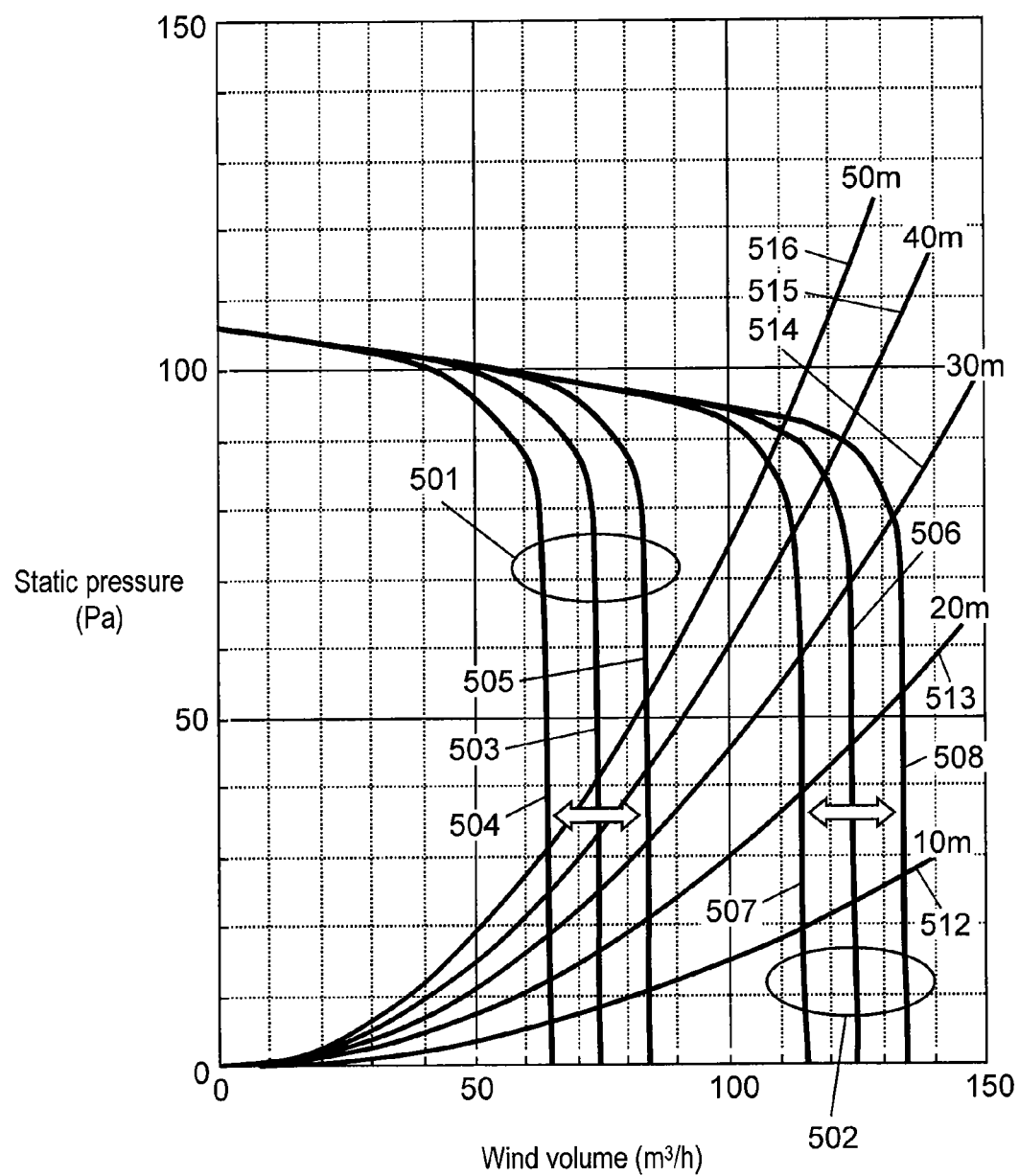
FIG. 5 is a diagram showing a wind volume-static pressure characteristic of the ventilation device in which the blowing device is installed.

FIG. 1 is a block diagram of ventilation device 1 in which a blowing device is installed in preferred embodiment 1 of the present invention. FIG. 2A is a side view of the ventilation device. FIG. 2B is a front view of the ventilation device. FIG. 2C is a partially cut-away plan view of the ventilation device. FIG. 3 is a diagram showing an example of an equivalent voltage-inverter circuit supply current characteristic to be applied to an inverter circuit to be installed in the blowing device. FIG. 4 is a diagram showing an example of a rotating speed-torque characteristic of a brushless DC motor to be installed in the blowing device. FIG. 5 is a diagram showing a wind volume-static pressure characteristic of the ventilation device in which the blowing device is installed.

As shown in FIG. 1, and FIG. 2A to FIG. 2C, blowing device 10 of the present preferred embodiment incorporates centrifugal blower 10a having brushless DC motor 11, and is connected to an external power source. Ventilation device 1 incorporates blowing device 10, and contaminated indoor air mixed with cigarette smoke or cooking smoke sucked in through blowing device 10 passes through a discharge port of ventilation device 1, duct 27, and the building wall, and is discharged outdoors.

Magnet rotor 3 of brushless DC motor 11 is formed integrally with a shaft by polarizing and orienting at the time of injection molding of a plastic magnet, and a main magnetic pole is polar anisotropic magnet. The sheath of brushless DC motor 11 is molded with a filler material such as calcium carbonate or aluminum hydroxide, and a resin such as unsaturated polyester containing a glass fiber. The sheath of brushless DC motor 11 incorporates magnetic flux density distribution detector 4, inverter circuit 6, drive logic controller 5, and PWM (pulse wave modulation) controller 23.

Magnetic flux density distribution detector 4 is composed of a Hall element as a magnetic pole position detector for detecting the magnetic pole position and the magnetic flux density distribution of magnet rotor 3. Inverter circuit 6 is composed by bridge connection of switching elements Q1, Q3, Q5 of upper stage side, and switching elements Q2, Q4, Q6 of lower stage side. Drive logic controller 5 controls to turn on/off switching elements Q1 to Q6 so that driving coil 2 may be energized in full wave sequentially in a specified direction and sequence, on the basis of the output from Hall element (magnetic flux density distribution detector 4). PWM controller 23 controls switching elements Q2, Q4, Q6 of lower stage side by PWM.

Herein, since the main magnetic pole of magnet rotor 3 is a polar anisotropic magnet, the induced voltage induced in driving coil 2 is a nearly sinusoidal waveform, and the detected waveform of Hall element (magnetic flux density distribution detector 4) is also a nearly sinusoidal waveform. Current waveform controller 7 in drive logic controller 5 adjusts the on/off duty of switching elements Q2, Q4, Q6 of lower stage side while controlling by feedback so that the current waveform of each phase of driving coil 2 may be a waveform similar to the waveform of Hall element (magnetic flux density distribution detector 4). Therefore, in the current supplied in inverter circuit 6, there is no non-energized section, and the current waveform is free from steep changes, and occurrence of ripples may be suppressed.

Further, the outside of brushless DC motor 11 is provided with rectifier 19, smoother 20, duty indicator 12, applied voltage detector 18, equivalent voltage detector 8, current detector 15, reference current value indicator 16, correlative relation indicator 13, supply current value controller 17, atmospheric temperature detector 21, temperature compensator 22, wind volume indicator 24, reference current value indication changer 25, correlative relation changer 26, and current value indicator 9.

Rectifier 19 rectifies the supplied commercial alternating-current power source in full wave. Smoother 20 smoothes the power source full-wave rectified by rectifier 19. Duty indicator 12 reduces the direct-current voltage smoothed smoother 20, and indicates an on/off duty of PWM controller 23. Applied voltage detector 18 detects the voltage value of the direct-current voltage applied to inverter circuit 6 after being smoothed by smoother 20. Equivalent voltage detector 8 detects the equivalent voltage to be applied to driving coil 2 by multiplying the voltage detected in applied voltage detector 18 by the on/off duty indicated by duty indicator 12. Current detector 15 detects the current to be supplied to inverter circuit 6. Reference current value indicator 16 determines the reference current value to be supplied to inverter circuit 6, at the time of a specified voltage of equivalent voltage to be detected by equivalent voltage detector 8.

Supply current value controller 17 controls duty indicator 12 so that the average current value supplied in inverter circuit 6, detected by current detector 15, may be equivalent tot the current value indicated by current value indicator 9. As a result, while varying the on/off duty of PWM controller 23, the average current value to be supplied to inverter circuit 6 is controlled by feedback. Temperature compensator 22 changes the reference current value by determining the changing amount depending on the difference between the reference temperature and the atmospheric temperature detected by atmospheric temperature detector 21, depending on the magnitude of the resistance value of resistor R3 to be connected.

Correlative relation indicator 13 indicates a correlative relation so that the supply current to be supplied to inverter circuit 6 may change proportionally to the voltage applied to inverter circuit 6. That is, in this preferred embodiment, when the equivalent voltage is large, the supply current increases linearly, and when the equivalent voltage is smaller, the supply current decreases linearly, as shown in the correlative relation in FIG. 3.

Herein, in FIG. 3, section 310 for controlling the supply current to inverter circuit 6 on the basis of equivalent voltage indicates a case of weak output 301 and a case of strong output 302 of blowing device 10. In the case of weak output 301, the control characteristic of the supply current in relation to the equivalent voltage at the time of reference temperature is indicated by line 303, the control characteristic of the supply current in relation to the equivalent voltage at the time of lower temperature than reference temperature is indicated by line 304, and the control characteristic of the supply current in relation to the equivalent voltage at the time of higher temperature than reference temperature is indicated by line 305, respectively. In the case of strong output 302, the control characteristic of the supply current in relation to the equivalent voltage at the time of reference temperature is indicated by line 306, the control characteristic of the supply current in relation to the equivalent voltage at the time of lower temperature than reference temperature is indicated by line 307, and the control characteristic of the supply current in relation to the equivalent voltage at the time of higher temperature than reference temperature is indicated by line 308, respectively. In this preferred embodiment, an example of weak output 301 is explained below.

Current value indicator 9 feeds back the change of supply current to inverter circuit 6 in relation to the equivalent voltage, so that the equivalent voltage-supply current characteristic may be the characteristic as shown in FIG. 3, on the basis of the output from correlative relation indicator 13. That is, depending on the magnitude of the equivalent voltage value detected by equivalent voltage detector 8, the current to be supplied to inverter circuit 6 is changed linearly (proportionally) according to the characteristic shown in FIG. 3, for example, as indicated by line 303, with respect to the reference current value, and the average current value to be supplied to inverter circuit 6 is determined. At this time, in consideration of the withstand voltage of inverter circuit 6 and the kickback voltage, an upper limit is provided for the on/off duty, there are sections 309, 311 for operating at a constant on/off duty without limiting the current.

At this time, the temperature compensator 22, as shown in FIG. 3, changes the reference current value indicated by reference current value indicator 16 to a higher value when the atmospheric temperature detected by atmospheric temperature detector 21 is higher than the reference temperature (to control by line 305 of control characteristic). To the contrary, when the atmospheric temperature detected by atmospheric temperature detector 21 is lower than the reference temperature, the reference current value indicated by reference current value indicator 16 is changed to a lower value (to control by line 306 of control characteristic).

Reference current value indicator 16 determines the reference current value to be supplied to inverter circuit 6 when the equivalent voltage detected by equivalent voltage detector 8 is a specified voltage, depending on the magnitude of resistance value of resistance R2 to be connected. Reference current value indication changer 25 changes the resistance value of resistance R2 to be connected to reference current value indicator 16, depending on the indication state of wind volume indicator 24.

Atmospheric temperature detector 21 detects the atmospheric temperature of the space in which blowing device 10 is installed. Wind volume indicator 24 indicates the wind volume, for example, by an input from outside.

Correlative relation indicator 13 determines, depending on the magnitude of the resistance vale of resistance R1 to be connected, the changing amount for changing the correlative relation of the supply current to be supplied to inverter circuit 6 to the voltage applied to inverter circuit 6, in relation to the reference current value indicated by reference current value indicator 16.

Correlative relation changer 26 changes the resistance value of resistance R1 to be connected to correlative relation indicator 13 depending on the indication state of wind volume indicator 24.

In the blowing device of the present preferred embodiment having such configuration, the operation is as explained below. On the basis of the equivalent voltage applied to driving coil 2 detected by equivalent voltage detector 8, current value indicator 9 determines the average current value to be supplied to inverter circuit 6 as the current value to be indicated, according to the linear characteristic shown in FIG. 3. Supply current value controller 17 controls duty indicator 12, so that the average current value detected by current detector 15 may be the current value determined in current value indicator 9. As a result, the rotating speed of brushless DC motor 11 is controlled by way of PWM controller 23. In this preferred embodiment, the current value to be determined in current value indicator 9 is changed on the basis of outputs from correlative relation indicator 13, temperature compensator 22, and wind volume indicator 24.

Once the specification of the fan used in centrifugal blower 10a, the specification of the winder of brushless DC motor 11, and the specification of the magnet of brushless DC motor 11 are specified, and the desired wind volume is determined, the characteristic of the supply current value to the equivalent voltage is determined, for example, at the reference temperature specified as standard (20° C. in Japan, 25° C. in the United States, etc.). Therefore, depending on the atmospheric temperature or specification changes, only by changing the values of resistance R1 or resistance R3, the characteristic of supply current value in relation to the equivalent voltage can be changed easily. Or, along with elevation of static pressure, if desired to change the specification of the product, such as increase of wind volume or decrease of wind volume, only by changing the values of resistance R1 or resistance R2, the characteristic of the supply current value to the equivalent voltage can be easily changed. Also when desired to decrease the wind volume at the time of low temperature, or to increase the wind volume at the time of high temperature, only by changing the values of resistance R1 or resistance R3, the characteristic of the supply current value to the equivalent voltage can be easily changed.

That is, according to blowing device 10 of the present preferred embodiment, correlative relation indicator 13 changes the current to be supplied to inverter circuit 6 linearly with respect to the reference current value, and indicates to current value indicator 9, depending on the magnitude of the equivalent voltage value detected by equivalent voltage detector 8. Therefore, when the rotating speed is higher, the supply current increases, and when the rotating speed is lower, the supply current decreases. Accordingly, as shown in FIG. 4, along with elevation of the rotating speed, the rotating speed-torque characteristic of brushless DC motor 11 is a characteristic of increasing in the shaft torque.

FIG. 4 corresponds to the characteristic of FIG. 3, and section 410 for controlling the supply current to inverter circuit 6 on the basis of the equivalent voltage indicates a case of weak output 401 and a case of strong output 402 of blowing device 10. In the case of weak output 401, the control characteristic of the torque in relation to the rotating speed at the time of reference temperature is indicated by line 403, the control characteristic of the torque in relation to the rotating speed at the time of lower temperature than reference temperature is indicated by line 404, and the control characteristic of the torque in relation to the rotating speed at the time of higher temperature than reference temperature is indicated by line 405, respectively. In the case of strong output 402, the control characteristic of the torque in relation to the rotating speed at the time of reference temperature is indicated by line 406, the control characteristic of the torque in relation to the rotating speed at the time of lower temperature than reference temperature is indicated by line 407, and the control characteristic of the torque in relation to the rotating speed at the time of higher temperature than reference temperature is indicated by line 408, respectively. In FIG. 3, sections 309, 311 for operating at a constant on/off duty without controlling the current correspond respectively to sections 409, 411 in FIG. 4. FIG. 4 further shows load curve 412 at zero static pressure, and load curve 413 at maximum static pressure.

According to the characteristic shown in FIG. 4, ventilation device 1 in which blowing device 10 is installed has the characteristic as shown in FIG. 5. FIG. 5 corresponds to the characteristic in FIG. 3, FIG. 4, indicating a case of weak output 501 and a case of strong output 502 of blowing device 10. In the case of weak output 501, the wind volume-static pressure characteristic at the time of reference temperature is indicated by line 503, the wind volume-static pressure characteristic at the time of lower temperature than reference temperature is indicated by line 504, and the wind volume-static pressure characteristic at the time of higher temperature than reference temperature is indicated by line 505, respectively. In the case of strong output 502, the wind volume-static pressure characteristic at the time of reference temperature is indicated by line 506, the wind volume-static pressure characteristic at the time of lower temperature than reference temperature is indicated by line 507, and the wind volume-static pressure characteristic at the time of higher temperature than reference temperature is indicated by line 508, respectively. FIG. 5 further shows five types of pressure loss curve varied in the duct resistance. The duct resistance is varied by changing the length of duct 27, and specifically curve 512 shows a duct length of 10 m, curve 513 shows a duct length of 20 m, curve 514 shows a duct length of 30 m, curve 515 shows a duct length of 40 m, and curve 516 shows a duct length of 50 m. Other than the duct length, the pressure loss may be also varied by other various factors, such as duct shape, and external wind pressure, but the characteristics are similar.

As known from FIG. 5, according to the present preferred embodiment, as shown in FIG. 3, by controlling the supply current in relation to the equivalent voltage in a linear change, a stable wind volume-static pressure characteristic not largely changed in wind volume is obtained, in spite of changes in external wind pressure, duct length, or pressure loss.

Temperature compensator 22 in FIG. 1 changes the reference current value depending on the temperature detected by atmospheric temperature detector 21. Accordingly, when the detected temperature is higher than the reference temperature, the characteristic tends to be higher in shaft torque (in FIG. 4, becoming higher from line 403 of reference temperature characteristic to line 405 of high temperature characteristic). When the detected temperature is lower than the reference temperature, the characteristic tends to be lower in shaft torque (in FIG. 4, becoming lower from line 403 of reference temperature characteristic to line 404 of low temperature characteristic). Therefore, according to this characteristic, in ventilation device 1 in which blowing device 10 is installed, when the atmospheric temperature is high such as in summer, the ventilation wind volume is increased in the wind volume-static pressure characteristic (in FIG. 5, changing from line 503 of the wind volume-static pressure characteristic at reference temperature to line 505 of the wind volume-static pressure characteristic at high temperature). Or when the atmospheric temperature is low such as in winter, the ventilation wind volume is decreased in the wind volume-static pressure characteristic (in FIG. 5, changing from line 503 of the wind volume-static pressure characteristic at reference temperature to line 504 of the wind volume-static pressure characteristic at low temperature).

Moreover, depending on the magnitude of the resistance value of resistance R1 connected to correlative relation indicator 13, it is possible to determine the changing amount of changing with respect to the reference current value indicated by reference current value indicator 16. As a result, in the rotating speed-torque characteristic of brushless DC motor 11, along with elevation of rotating speed, the degree of increase of shaft torque can be changed. Hence, it is possible to adjust the specification to cope with change in the internal load of ventilation device 1, or to adjust the specification or adjust the wind volume-static pressure characteristic of blowing device 10 to cope with load changes due to blade diameter change, change in the number of blades, or blade specification change of centrifugal blower 10a. In other words, since the specification can be changed only by changing the resistance value of resistance R1, the number of processes required for specification adjustment can be substantially saved, and the principal control circuit of brushless DC motor 11 can be standardized.

Still more, depending on the magnitude of the resistance value of resistance R2 connected to reference current value indicator 16, it is possible to determine the reference current value supplied to inverter circuit 6 when the equivalent voltage detected by equivalent voltage detector 8 is at specified voltage. Hence, only by changing the resistance value of resistance R2, it is possible to adjust the specification to cope with change in the internal load of ventilation device 1, or to adjust the wind volume in the wind volume-static pressure characteristic of ventilation device 1. In other words, since the specification can be changed only by changing the resistance value of resistance R2, the number of processes required for specification adjustment can be substantially saved, and the principal control circuit of brushless DC motor 11 can be standardized.

In addition, depending on the magnitude of the resistance value of resistance R3 connected to temperature compensator 22, it is possible to determine the changing amount of changing the reference current value depending on the difference between the reference temperature and the atmospheric temperature detected by atmospheric temperature detector 21. Hence, the changing amount of changing the wind volume due to change in the atmospheric temperature can be easily adjusted depending on the specification required in ventilation device 1. That is, only by changing the resistance value of resistance R3, the specification can be adjusted, the number of processes required for specification adjustment can be substantially saved, and the brushless DC motor and the principal control circuit can be standardized.

Moreover, depending on the indication state of wind volume indicator 24, reference current value indication changer 25 will change the resistance value of resistance R2 to be connected to reference current value indicator 16. As a result, it is easy to adjust the wind volume depending on the wind volume indication of wind volume indicator 24. Therefore, the wind volume of only resistance R2 can be adjusted depending on the necessary wind volume required in a room in which ventilation device 1 is installed. That is, the number of processes required for specification adjustment can be substantially saved, and the brushless DC motor and the principal control circuit can be standardized.

Further, depending on the indication state of wind volume indicator 24, correlative relation changer 26 will change the resistance value of resistance R1 to be connected to correlative relation indicator 13. As a result, it is easy to adjust the wind volume characteristic depending on the wind volume-static pressure characteristic required in blowing device 10. Therefore, only resistance R1 can be adjusted depending on the necessary wind volume required in a room in which ventilation device 1 is installed, and the number of processes required for specification adjustment can be substantially saved, and the brushless DC motor and the principal control circuit can be standardized.

Drive logic controller 5 supplies a current free from non-energized section to driving coil 2. As a result, ripples are substantially decreased in the current supplied to the inverter circuit. It is hence possible to present blowing device 10 and ventilation device 1 realizing high precision of wind volume precision by enhancing the precision of current detection by current detector 15, and low vibration by decrease of torque ripple of the motor.

In order that the waveform detected by magnetic flux density distribution detector 4 may be similar to the induced voltage waveform induced in driving coil 2 by polar anisotropic magnet 3a, a gap is set and disposed between magnetic flux density distribution detector 4 and the magnet. Current waveform controller 7 provided driving coil 2 with a current similar to magnetic flux density distribution waveform detected by magnetic flux density distribution detector 4. Hence, the induced voltage waveform and the current waveform are similar to each other, and it is effective to suppress the torque ripple and the torque changing rate furthermore. In addition, since the motor efficiency is enhanced substantially, blowing device 10 and ventilation device 1 realizing low noise and high efficiency can be obtained.

Moreover, since the main magnetic pole of magnet rotor 3 is polar anisotropic magnet 3a, both induced voltage waveform and the current waveform are sinusoidal. Hence, the torque ripple and the torque changing rate can be further suppressed low, and the motor efficiency is enhanced greatly. Therefore, blowing device 10 and ventilation device 1 realizing low noise and high efficiency can be obtained.

In the present preferred embodiment 1, depending on the magnitude of the equivalent voltage value detected by equivalent voltage detector 8, correlative relation indicator 13 indicates the current to be supplied to inverter circuit 6 by linear change in relation to the reference current value. However, it may be also designed to change nonlinearly (in higher proportion), or same action and effect will be obtained by setting properly so as to obtain an optimum inclination of the characteristic curve of the rotating speed-torque characteristic from the fan load or other load amount.

Also in the present preferred embodiment 1, the current waveform supplied in driving coil 2 is formed in a waveform similar to the induced voltage waveform. However, depending on the application, the required wind volume precision of the product, or the noise level, other driving systems may be used, such as 120-degree square wave current feed, 140-degree or 150-degree or other wide-angle current feed, or sinusoidal driving system by two-phase modulation. In such configuration, too, the rotating speed-torque characteristic of the motor has the same characteristic increasing in the shaft torque as the rotating speed is elevated.

Also in the present preferred embodiment 1, atmospheric temperature detector 21 and temperature compensator 22 are provided, and the wind volume is controlled at a constant level depending on the atmospheric temperature. However, in any electrical equipment not required to change the blowing wind volume depending on the atmospheric temperature, atmospheric temperature detector 21 and temperature compensator 22 are not needed, and it may be set appropriately depending on the required specification for the blower.

Also in the present preferred embodiment 1, the magnetic pole position of the magnet rotor is detected by using Hall element (magnetic flux density distribution detector 4). However, same action and effect will be obtained by other method, such as sensor-less method of determining the current feeding phase on the magnet rotor by detecting the induced voltage or current induced in the non-energizing phase, or a method of using a magnetic pole position detector for detecting the magnetic pole position of the magnet rotor by judging the N-pole and the S-pole of the magnet such as Hall IC.

In the present preferred embodiment 1, wind volume indicator 24 is provided to change the wind volume setting and the wind volume characteristic. However, if only one type is enough for setting the wind volume, wind volume indicator 24, reference current value indication changer 25, and correlative relation changer 26 are not needed, and it is enough to set appropriately depending on the required specification for the blower.

In the present preferred embodiment, correlative relation indicator 26 indicates the relation of the supply current value to inverter circuit 6 in relation to the equivalent voltage. However, if fluctuations of the direct-current voltage after rectification by rectifier 19 can be ignored, same action and effect will be obtained by indicating the correlative relation of the on/off duty indicated by duty indicator 12 and the supply current.

Preferred Embodiment 2

Figure 6:
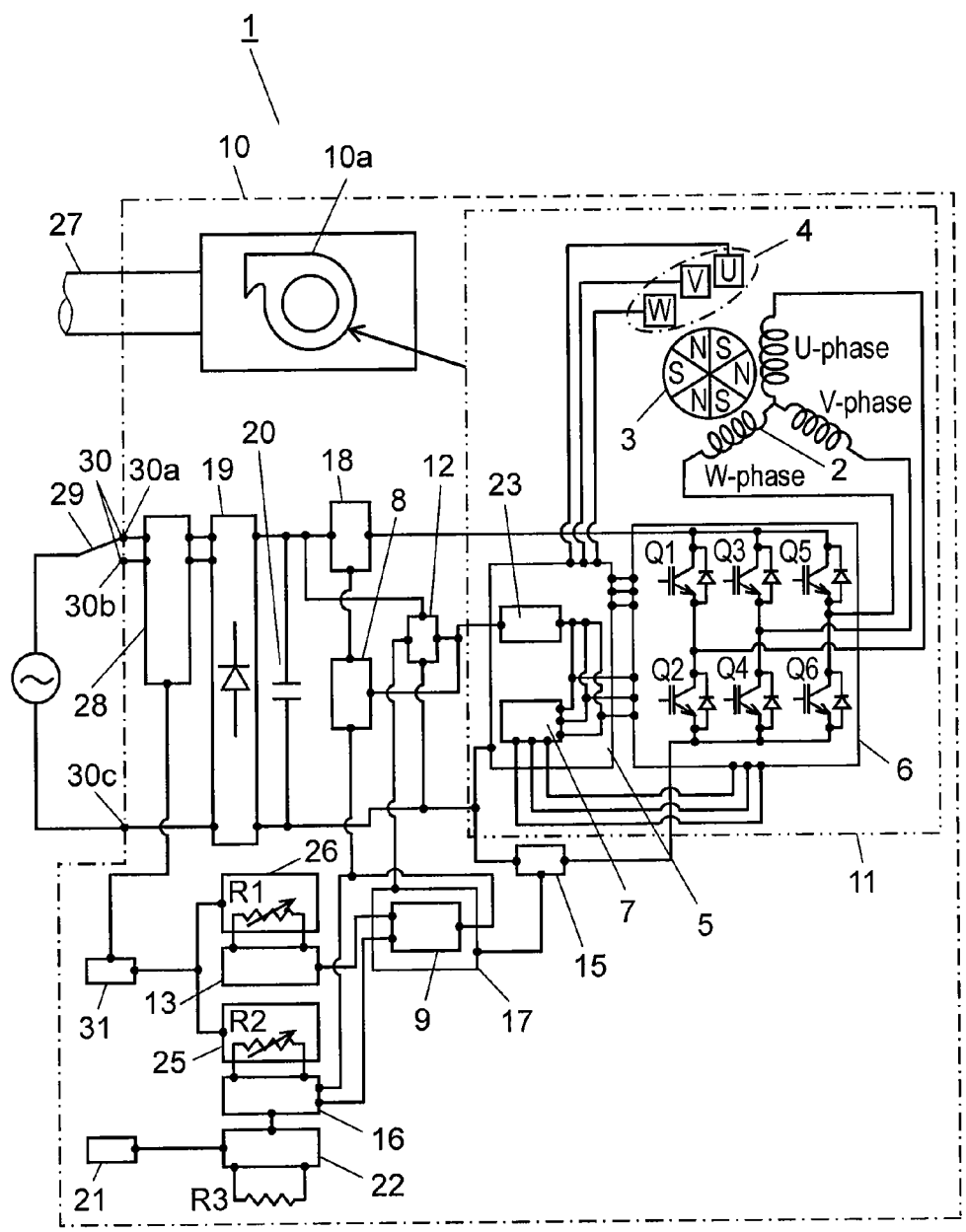
FIG. 6 is a block diagram of a ventilation device in which a blowing device is installed in preferred embodiment 2 of the present invention.
Figure 7:
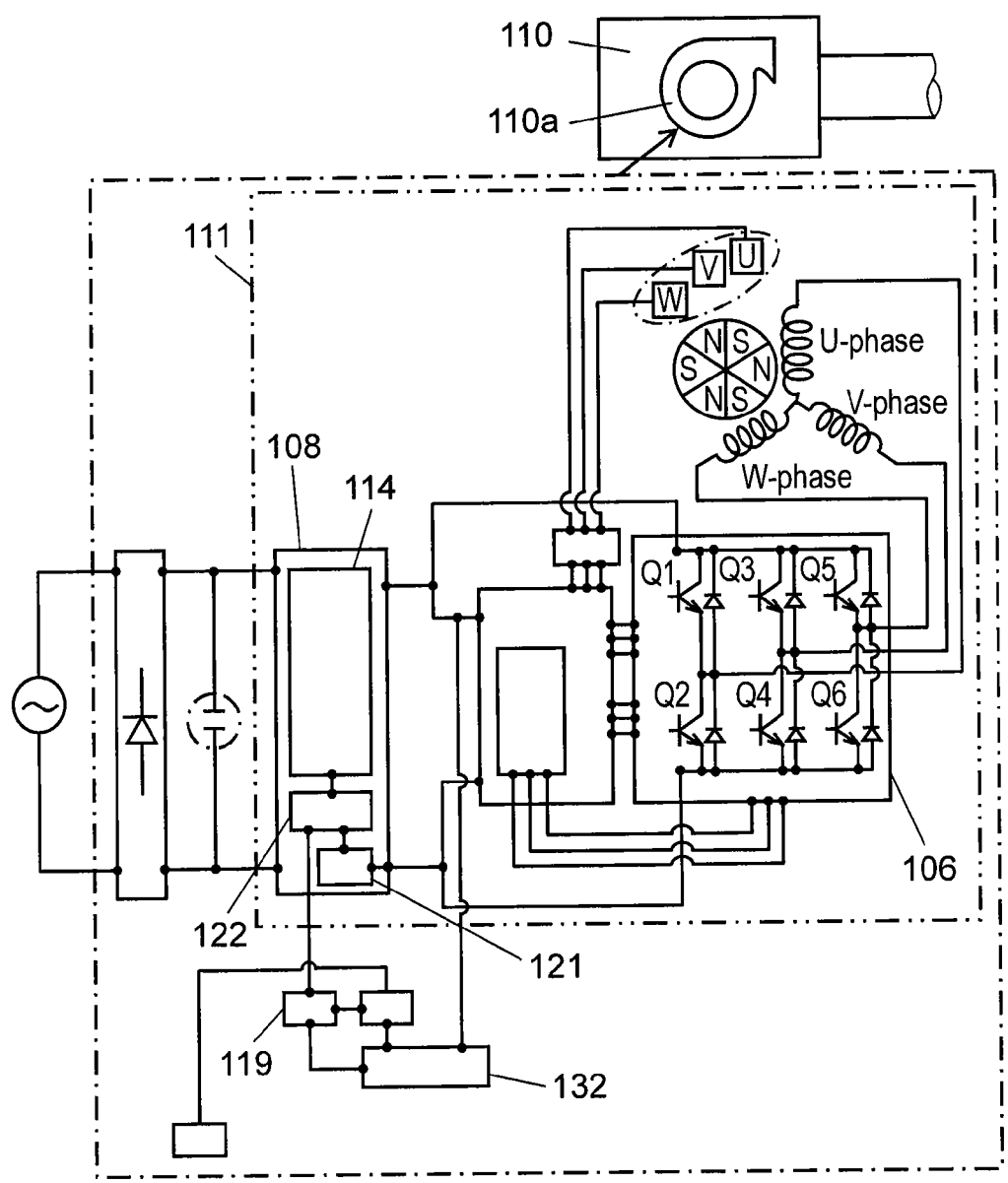
FIG. 7 is a block diagram of a conventional blowing device.

FIG. 6 is a block diagram of configuration of a ventilation device in which a blowing device is installed in preferred embodiment 2 of the present invention. What differs from preferred embodiment 1 lies in that speed adjustment indicator 28, external switch 29, and alternating-current power source connector 30 are provided between the commercial alternating-current power source and rectifier 19 as shown in FIG. 6. Same components are in preferred embodiment 1 are identified with same reference numerals, and detailed description is omitted.

Alternating-current power source connector 30 is composed of strong output connection terminal 30a, weak output connection terminal 30b, and common connection terminal 30c, and is connected to the commercial alternating-current power source. External switch 29 changes over connection to either one of strong output connection terminal 30a and weak output connection terminal 30b. The commercial alternating-current power source entered in alternating-current power source connector 30 is rectified and smoothed by rectifier 19 and smoother 20, and is applied to inverter circuit 6. Speed adjustment indicator 28 detects external switch 29 is connected to which one of strong output connection terminal 30a and weak output connection terminal 30b. Wind volume indicator 31 receives an output signal showing the detection result in speed adjustment indicator 28, and sends signals to reference current value indication changer 25 and correlative relation changer 26. Other components for composing blowing device 10, such as brushless DC motor 11, inverter circuit 6, drive logic controller 5, current detector 15, reference current value indicator 16, correlative relation indicator 13, and temperature compensator 22, are same as in preferred embodiment 1 in both configuration and operation.

According to blowing device 10 of the present preferred embodiment, speed adjustment indicator 28 detects, in alternating-current power source connector 30, whether external switch 29 is connected to strong output connection terminal 30*a*, or connected to weak output connection terminal 30*b*. On the basis of this result, wind volume indicator 31 controls reference current value indication changer 25, and changes the resistance value of resistance R2 connected to reference current value indicator 16. Accordingly, the reference set value of the current to be supplied to inverter circuit 6 is changed. In other words, the wind volume is changed in two stages, depending on whether the commercial alternating-current power source is connected to strong output connection terminal 30*a*, or weak output connection terminal 30*b*.

When speed adjustment indicator 28 detects that external switch 29 connects weak output connection terminal 30*b* to the commercial alternating-current power source, wind volume indicator 31 controls, and reference current value indication changer 25 changes the resistance value of resistance R2 to be connected to reference current value indicator 16, for example, to a smaller value. On the basis of this change, current value indicator 9 is controlled according to line 303 of the characteristic at the reference temperature in the case of weak output 301, out of the characteristic of the equivalent voltage to the supply current shown in FIG. 3. As a result, the rotating speed-torque characteristic shown in FIG. 4 is controlled according to line 403 of the characteristic at the reference temperature in the case of weak output 401. Therefore, the wind volume-static pressure characteristic shown in FIG. 5 is controlled according to line 503 of the characteristic at the reference temperature in the case of weak output 501, and a stable wind volume is obtained.

To the contrary, when speed adjustment indicator 28 detects that external switch 29 connects strong output connection terminal 30*a* to the commercial alternating-current power source, wind volume indicator 31 controls, and reference current value indication changer 25 changes the resistance value of resistance R2 to be connected to reference current value indicator 16, for example, to a larger value. On the basis of this change, current value indicator 9 is controlled according to line 306 of the characteristic at the reference temperature in the case of strong output 302, out of the characteristic of the equivalent voltage to the supply current shown in FIG. 3. As a result, the rotating speed-torque characteristic shown in FIG. 4 is controlled according to line 406 of the characteristic at the reference temperature in the case of strong output 402. Therefore, the wind volume-static pressure characteristic shown in FIG. 5 is controlled according to line 506 of the characteristic at the reference temperature in the case of strong output 502, and a stable wind volume is obtained.

In this manner, the blowing device is capable of adjusting the speed by changing over the connection of the commercial alternating-current power source by external switch 29. Herein, in alternating-current power source connector 30, depending on the number of connection terminals, when wind volume indicator 31 changes the reference set value, the speed can be adjusted controllably according to changes of the atmospheric temperature freely by the number of connection terminals.

Further, wind volume indicator 31 controls correlative relation changer 26, and changes the resistance value of resistance R1 connected to correlative relation indictor 13. Accordingly, the blowing device is capable of easily changing the wind volume-static pressure characteristic by connection changeover of the commercial alternating-current power source. Hence, in alternating-current power source connector 30, depending on the number of connection terminals, when wind volume indicator 31 changes the correlative relation, the wind volume can be adjusted controllably according to changes of the atmospheric temperature freely by the number of connection terminals.

As explained herein, the preferred embodiment of the present invention includes a blower having a brushless DC motor, an inverter circuit connected to the brushless DC moor, an applied voltage detector for detecting the voltage to be applied to the inverter circuit, and a supply current value controller for controlling the average current to be supplied to the inverter circuit at a constant level. It further includes a correlative relation indicator for indicating a correlative relation in which the supply current to be supplied to the inverter circuit is changed proportionally in relation to the voltage applied to the inverter circuit, and the supply current value controller controls the average current to be supplied to the inverter circuit so as to be equal to the value of the supply current indicated by the correlative relation indicator.

Therefore, since the supply current value controller controls the average current to be supplied to the inverter circuit so as to be equal to the supply current value indicated by the correlative relation indicator, it is possible to realize a wind volume-static pressure characteristic of high precision extremely small in changes of wind volume if the pressure loss or static pressure varies.

Moreover, the preferred embodiment of the present invention has the following components: a blower having a brushless DC motor; an inverter circuit connected in bridge by a plurality of switching elements; an applied voltage detector for detecting the voltage value of a direct-current voltage applied to the inverter circuit; a drive logic controller for controlling the direct-current voltage applied to the inverter circuit by PWM by switching elements, and feeding to the driving coil of the brushless DC motor; a duty indicator for indicating an on/off duty when controlling the switching elements by PWM; a supply current value controller for changing the output of the duty indicator and varying the on/off duty of pulse width modulation control of the switching elements, and controlling the average current to be supplied to the inverter circuit at a constant level; a current value indicator for indicating an average current value for controlling at a constant level by means of the supply current value controller; an equivalent voltage detector for detecting the equivalent voltage to be applied to the driving coil by multiplying the voltage value detected by the applied value detector by a duty indicated by the duty indicator; a reference current value indicator for indicating the reference current value to be indicated by the current value indicator when the equivalent voltage detected by the equivalent voltage detector is at a specified voltage; and a correlative relation indicator for indicating the correlative relation with the average current value to be indicated by the current value indicator, depending on the voltage value of the equivalent voltage detected by the equivalent voltage detector. The correlative relation indicator determines the average current value indicated by the current value indicator by varying the reference current value indicated by the reference current value indicator in a proportional relation.

According to the preferred embodiment of the present invention, the equivalent voltage detector multiplies the voltage value detected by the applied voltage detector by the duty indicated by the duty indicator, and detects the equivalent voltage to be applied to the driving coil. The reference current value indicator indicates the reference current value indicated by the current value indicator when the equivalent voltage indicated by the equivalent voltage detector is at the specified voltage. The correlative relation indicator changes the reference current value indicated by the reference current value indicator proportionally linearly or nonlinearly, and determines the average current value indicated by the current value indicator. The supply current value controller controls the average current to be supplied to the inverter circuit so as to be equal to the current value indicated by the current value indicator, by varying the on/off duty for PWM control of the switching elements. Therefore, the correlative relation between the equivalent voltage applied to the driving coil of the brushless DC motor, and the current flowing in the driving coil is not changed, and hence the direct-current voltage controller formed by a chopper circuit for generating a direct-current voltage to be applied to the inverter circuit is not needed. As a result, the circuit space is reduced, and the efficiency and the quality are enhanced by reduction of switching loss of the direct-current voltage controller formed by the chopper circuit. Moreover, the brushless DC motor is free from effects of variation of power supply voltage, and the rotating speed-torque characteristic is further enhanced in the shaft torque along with elevation of the rotating speed. Hence, if the pressure loss or static pressure is changed, the wind volume is not changed significantly, and a stable wind volume-static pressure characteristic may be realized.

According to the preferred embodiment of the present invention, the correlative relation indicator determines the changing amount of changing in relation to the reference current value indicated by the reference current value indicator, depending on the magnitude of the resistance value to be connected. As a result, by changing the resistance value of the resistance to be connected to the correlative relation indicator, the wind volume-static pressure characteristic can be adjusted. Therefore, the number of processes required to adjust the specification can be substantially saved, and the motor can be standardized.

Moreover, in the preferred embodiment of the present invention, the reference current value indicator determines the reference current value to be indicated depending on the magnitude of the resistance value to be connected. As a result, the wind volume can be adjusted by changing the resistance value of the resistance connected to the reference current value indicator. Therefore, the number of processes required to adjust the specification can be substantially saved, and the motor can be standardized.

The preferred embodiment of the present invention includes a wind volume indicator, and a reference current value indication changer for changing the resistance value to be connected to the reference current value indicator, and depending on the indication state of the wind volume indicator, the reference current value indication changer changes the resistance value to be connected to the reference current value indicator. As a result, the wind volume can be adjusted depending on the wind volume indication of the wind volume indicator by changing the resistance value of the resistance connected to the reference current value indicator. Therefore, the number of processes required to adjust the specification such as speed adjustment can be substantially saved, and the motor can be standardized.

The preferred embodiment of the present invention further includes a correlative relation changer for changing the resistance value to be connected to the correlative relation indicator, and depending on the indication state of the wind volume indicator, the correlative relation changer changes the resistance value to be connected to the correlative relation indicator. As a result, the wind volume-static pressure characteristic can be adjusted depending on the speed setting of strong or weak output by changing the resistance value of the resistance connected to the correlative relation indicator. Therefore, the number of processes required to adjust the specification can be substantially saved, and the motor can be standardized.

The preferred embodiment of the present invention further includes an atmospheric temperature detector for detecting the atmospheric temperature, and a temperature compensator for elevating the reference current value indicated by the reference current value indicator when the atmospheric temperature detected by the atmospheric temperature detector is higher than the reference temperature, or lowering the reference current value indicated by the reference current value indicator when the detected atmospheric temperature is lower than the reference temperature. As a result, the temperature compensator elevates the reference current value indicated by the reference current value indicator when the detected atmospheric temperature is higher than the reference temperature. It lowers the reference current value indicated by the reference current value indicator when the detected atmospheric temperature is lower than the reference temperature. Accordingly, the circuit space is suppressed from being wider, and the quality is enhanced. Further, in the rotating speed-torque characteristic increased further in the shaft torque along with the elevation of rotating speed, when the atmospheric temperature rises, the shaft torque increases, and when the atmospheric temperature declines, the shaft torque decreases. Therefore, when the atmospheric temperature becomes higher, the blowing wind volume increases, and when the atmospheric temperature becomes lower, the blowing wind volume decreases. Moreover, if the pressure loss or the static pressure changes, the wind volume is not changed significantly according to the wind volume-static pressure characteristic.

In the preferred embodiment of the present invention, the temperature compensator determines the changing amount of changing the reference current value depending on the difference from the reference temperature due to magnitude of the resistance value to be connected. As a result, by the change of the resistance value of the resistance to be connected to the temperature compensator, the wind volume at the time of change in the atmospheric temperature can be adjusted. Therefore, the number of processes required to adjust the specification can be substantially saved, and the motor can be standardized.

The preferred embodiment of the present invention further includes a plurality of alternating-current power source connectors for connecting the alternating-current power source, and the reference current value to be indicated by the reference current value indicator is changed depending on the connecting positions to the alternating-current power source connectors. Hence, the reference current value to be indicated by the reference current value indicator is changed depending on the connecting positions to the alternating-current power source connectors. Therefore, the strong and weak wind volume can be adjusted, and the number of processes required to adjust the specification such as speed adjustment can be substantially saved, and the motor can be standardized.

In the preferred embodiment of the present invention, the drive logic controller supplies an electric current free from non-energizing section to the driving coil. Hence, the current ripple supplied to the inverter circuit is substantially decreased, and the motor torque ripple decreases. Therefore, the wind volume precision is enhanced, and the vibration is lowered.

INDUSTRIAL APPLICABILITY

The present invention realizes a wind volume-static pressure characteristic simple in specification adjustment, small in circuit size, high in quality, small in effects of variation of power source voltage to be supplied, extremely small in variation of wind volume in spite of change in pressure loss or static pressure, and high in precision. Therefore, the present invention is very useful in a ventilation device of ceiling built-in type for exhausting or air intake, a water heater, an air-conditioner or other air conditioning machine, an air cleaner, a dehumidifier, a dryer, a fan filter unit, or the like.

The invention claimed is:

1. A blowing device comprising: a blower having a brushless DC motor; an inverter circuit connected in bridge by a plurality of switching elements; an applied voltage detector for detecting a voltage value of a direct-current voltage applied to the inverter circuit; a drive logic controller for controlling the direct-current voltage applied to the inverter circuit by pulse width modulation by the switching elements, and feeding to a driving coil of the brushless DC motor; a duty indicator for indicating an on/off duty when controlling the switching elements by pulse width modulation; a supply current value controller for controlling an average current supplied to the inverter circuit at a constant level, by varying the on/off duty of the pulse width modulation control of the switching element by changing an output of the duty indicator; a current value indicator for indicating the average current value for controlled at a constant value by the supply current value controller; an equivalent voltage detector for detecting an equivalent voltage to be applied to the driving coil by multiplying the voltage value detected by the applied voltage detector by a duty indicated by the duty indicator; a reference current value indicator for indicating a reference current value indicated by the current value indicator when the equivalent voltage detected by the equivalent voltage detector is at a specified voltage; and a correlative relation indicator for indicating a correlative relation with an average current value indicated by the current value indicator, depending on the voltage value of the equivalent voltage detected by the equivalent voltage detector, wherein the correlative relation indicator changes the reference current value indicated by the reference current value indicator in proportional relation to the equivalent voltage and determines the average current value to be indicated by the current value indicator.

2. The blowing device according to claim 1, wherein the correlative relation indicator determines the changing amount for changing the correlative relation of the supply current to be supplied to the inverter circuit in relation to the voltage applied to the inverter circuit, to the reference current value indicated by the reference current value indicator, depending on a magnitude of a resistance value to be connected.

3. The blowing device according to claim 1, wherein the reference current value indicator determines the reference current value to be indicated depending on a magnitude of a resistance value to be connected.

4. The blowing device according to claim 3, further comprising a wind volume indicator, and a reference current value indication changer for changing the resistance value to be connected to the reference current value indicator, wherein the reference current value indication changer changes the resistance value to be connected to the reference current value indicator, depending on the indication state of the wind volume indicator.

5. The blowing device according to claim 4, further comprising a correlative relation changer for changing the resistance value to be connected to the correlative relation indicator, wherein the correlative relation changer changes the resistance value to be connected to the correlative relation indicator, depending on the indication state of the wind volume indicator.

6. The blowing device according to claim 1, further comprising an atmospheric temperature detector for detecting an atmospheric temperature, and a temperature compensator for elevating the reference current value indicated by the reference current value indicator when the atmospheric temperature detected by the atmospheric temperature detector is higher than the reference temperature, or lowering the reference current value indicated by the reference current value indicator when the detected atmospheric temperature is lower than the reference temperature.

7. The blowing device according to claim 6, wherein the temperature compensator determines a changing amount of changing the reference current value according to a difference from the reference temperature, depending on the magnitude of the resistance value to be connected.

8. The blowing device according to claim 1, further comprising a plurality of alternating-current power source connectors for connecting an alternating-current power source, wherein the reference current value to be indicated by the reference current value indicator is changed depending on the connection positions to the alternating-current power source connectors.

9. The blowing device according to claim 1, wherein the drive logic controller supplies an electric current free from non-energized sections to the driving coil.

10. An electrical equipment in which the blowing device in claim 1 is installed.

11. An electrical equipment according to claim 10, wherein the electrical equipment is any one of a ventilation device, dehumidifier, humidifier, air-conditioner, water heater, and fan filter unit.

* * * * *